April 1, 1952     A. J. BURKLIN     2,591,400
WATER HEATER SYSTEM
Filed May 8, 1947
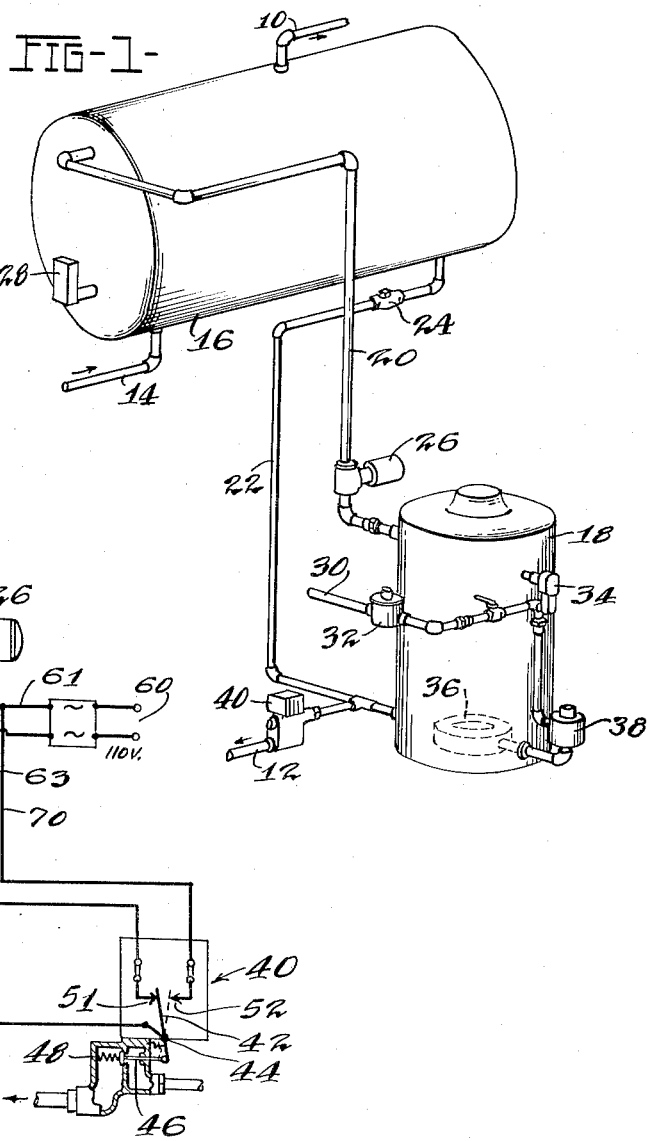
INVENTOR.
Adolf J. Burklin
BY
ATTYS.

Patented Apr. 1, 1952

2,591,400

UNITED STATES PATENT OFFICE 2,591,400

WATER HEATER SYSTEM

Adolf J. Burklin, Toledo, Ohio, assignor, by mesne assignments, to A. O. Smith Corporation, Milwaukee, Wis., a corporation of New York Application May 8, 1947, Serial No. 746,760

5 Claims. (Cl. 236—23)

This invention relates to water heaters and is particularly directed to a control system by which a single heater can be utilized to supply water to two outlets each carrying a different operating temperature. The control is an improvement on the type shown in my prior Patent Number 2,291,023 issued July 28, 1942.

In commercial water heater installations in which provision is made for a supply of high temperature sterilizing water, a single gas fired heater is used in conjunction with a storage tank and a circulating pump is interposed in the line to the heater. Control of the pump is by a thermostat immersed in the storage tank directly in the path of water flowing into the tank so that the pump operates whenever cold water enters the tank to make up for water discharged to a faucet. Gas to the heater is under a second thermostatic control, the element being immersed in that portion of the water circuit adjacent the heater inlet so that whenever relatively low temperature water enters the heater from the circulator the gas valve is opened and the heater burner set in operation. It will thus be seen that operation of the circulator and of the gas valve are concomitant; that whenever the gas supply to the heater is turned on, the circulator will be running since cold water will be entering the storage tank.

The primary object of the present invention is to provide a control for a dual temperature water heating system in which control of the flow of gas is independent of the control for the circulator.

Another object of the invention is to provide a control for a dual temperature water heating system in which control of the flow of gas is made to depend on water flow, initial water temperature and attained water temperature, while control of the circulator depends on initial water temperature only.

Other objects and advantages of the invention will become apparent from the following specification, reference being had to the accompanying drawings in which:

Figure 1 is a diagrammatic perspective view of a dual temperature water system having a control in accordance with the present invention; and Fig. 2 is a circuit diagram of the electrical controls involved in the present invention.

Referring to the drawings, the system in accordance with the present invention is constructed to discharge heated water to a low temperature line 10 in which water is carried at temperatures adjustable between 120° and 140° and also to a sterilizing line 12 in which the temperature of the water ranges between 175° and 190° depending on adjustment. Water is supplied to the system from a cold water supply 14 which enters directly to a storage tank 16 and the intermediate temperature line 10 is fed directly from the storage tank.

A heater 18, which may be of any suitable design, is provided to heat the water and has its inlet supplied by a line 20 from the storage tank and its outlet either returned to the storage tank through a line 22 or to the high temperature sterilizing line 12. A check valve 24 in line 22 prevents circulation of water through line 22 from the tank whenever the sterilizing line 12 is in use.

Since thermo-siphon action can not be relied upon to return water through line 22 with sufficient rapidity during a make-up period as will be hereinafter described, a circulator 26 is commonly provided in the heater in lead line 20. A conventional immersion thermostat 28 is provided to control the operation of the circulator and operation is such that water in the tank 16 is maintained in substantial volume at the intermediate temperature of 120–140°. The thermostat is so placed that it is not immediately influenced by cold water entering tank 16, since the capacity of the tank is such that, considering the capacity of the heater, it is undesirable to operate the heater with each withdrawal of intermediate temperature water.

Gas is supplied to the heater from a line 30 and passes through a pressure regulator valve 32 to a modulating thermostat 34, the element of which is immersed in the heater coils at such a point that it operates in accordance with the attained temperature of the water. The gas burner is shown diagrammatically at 36 and the supply thereto is controlled not only by the thermostat 34 but also by a conventional solenoid operated gas valve 38. The solenoid valve is conveniently of the normally closed poppet type in which a solenoid is utilized to overcome the tension of the closing spring and move the valve to open position. Since the thermostat and solenoid valve, per se, form no part of the invention, details of their construction are not shown.

A flow-sensitive switch 40 is provided in the high temperature line 12. The flow switch is shown diagrammatically in Fig. 2 and may comprise any suitable single pole-double throw switch which is operated in response to movement of water through the line 12. As indicated in Fig. 2 a common connector leaf 42 is pivoted at 44 and has one end disposed against the stem of a suitable flow motor 46 which is normally held in one direction by a spring 48. Flow of water through the device moves flow motor 46 against the tension of the spring and leaf 42 thus moves away from one contact and closes a cricuit to another, oppositely disposed, contact 52.

The electrical system is shown in Fig. 2 and comprises a suitable supply 60 indicated as the usual 110 volt 60 cycle source. One side of the supply line, designated 61, passes directly to one terminal of immersion thermostat 28, and the other terminal of the thermostat is connected through lead 62 to a control line 63 and circulator 26. Line 63 passes to the normally closed contact 51 of the flow switch 40 for a purpose which will presently become apparent. The circuit for the circulator 26 is completed through line 65 which passes to a safety device 67 which may be controlled by the pilot light for burner 36 in the usual manner. Such safety devices commonly take the form of switches which are closed only when heated so that if for any reason the pilot light becomes extinguished it is impossible to operate the burner. Similarly in this instance it is not possible to operate the circulator since switch 67 is in series with the circulator and a line 68 which represents the return to power source 60.

Connected to power line 61, ahead of the thermostat 28, and forming a parallel circuit around the thermostat is a power line 70 taken directly to contact 52 in the flow switch. The common center leaf or pole 42 of the flow switch is connected to line 72 which connects directly to one side of the solenoid operated gas valve 38, the return for which is to line 65 to which the circulator is connected. It will thus be seen that if the contact 42 is against the contact 51 the circuit to solenoid 38 is controlled by thermostat 28 while movement of switch element 42 to the position in which the circuit is closed to contact 52 results in closure of the solenoid circuit independently of the position of the thermostat 28. Thus the solenoid gas valve will be operated whenever the flow switch 40 is operated whether the circuit through thermostat 28 is open or closed and the circuit through the circulator 26 is always under the control of the immersion thermostat 28 irrespective of the position of the flow switch. However, if the flow switch is in its "no flow" position with contacts 42 and 51 closed, the closure of the circuit through thermostat 28 operates not only circulator 26 but also the solenoid gas valve 38.

In operation water may be drawn from the intermediate temperature line 10 at any time and cold water will enter the storage tank 16 from line 14. When the temperature in storage tank 16 is sufficiently reduced thermostat 28 will close the circuit to circulator 26 and cause water to be pumped from the storage tank through line 20 to the heater and returned to the storage tank through line 22 past check valve 24. When the circulator circuit is closed the circuit to the solenoid operated gas valve 38 is also closed and the burner is thus lighted. The volume of gas to the burner is determined by the modulating thermostat 34 and is just sufficient to maintain the proper temperature in that portion of the water circuit with which the modulating thermostat is associated. Circulation of water to and from storage tank 16 will continue, irrespective of whether water is being used by the faucets connected to line 10, until such time as the temperature of the water in the storage tank has attained the proper degree.

If, however, the sterilizing water line 12 is put in operation flow switch 40 immediately closes the circuit between contacts 42 and 52 and the burner is started in operation irrespective of the position, closed or open, of the immersion thermostat 28. Water at the intermediate temperature is thus drawn from the storage tank 16, passed through the heater 18 and taken directly to line 12 since check valve 24 will, in this instance, swing to its closed position. The circulator 26 is not needed to promote the water flow and its operation is thus dispensed with so long as line 12 is open and water at substantially the maximum temperature can be taken from heater 18. Here again, the volume of gas to the burner 36 is under control of the modulating thermostat 34 which will permit only sufficient gas to pass to the burner to keep the temperature in line 12 substantially constant.

When line 12 is again closed and sterilizing water no longer required the system again comes under the control of the immersion thermostat 28 since the flow switch 40 will have closed contact 42 against contact 51. In this position, as above stated, operation of thermostat 28 closes not only the circuit to circulator 26 but also to the solenoid operated gas valve 38. So long as the water temperature in the storage tank is below that required by thermostat 28, circulation of water and operation of the heater will continue. This is usually referred to as a "make-up" operation of the heater.

It will thus be seen that the present invention provides a control system in which the operation of the gas valve is made independent of the operation of the immersion thermostat whenever high temperature water is required but restores control to the thermostat during the interval when only low temperature or make-up water is being circulated to the storage tank 16.

While the invention has been disclosed in connection with a specific form and disposition of the parts it should be appreciated that numerous modifications and changes may be made without departing from the spirit of the appended claims.

What I claim is:

1. In a water heater system having a storage unit fed by a cold water inlet and a single heating unit with connections therebetween for circulation of water, and outlets for discharge of different temperature water from the system to a high temperature line and to a relatively low temperature line, a control member responsive to the temperature of the water in the system and electrically connected to the heating unit for actuating the same to maintain the water in the system at a predetermined temperature at all times, a switch electrically connected to said heating unit to actuate the same, and a flow motor in the high temperature line actuating said switch to operate said heating unit independently of said control member and of the temperature of the water in the storage unit during intervals when water is drawn from said high temperature line.

2. In a water heater system having a storage unit fed by a cold water inlet and a single heating unit with connections therebetween for circulation of water, and an outlet in the return connection from the heating unit to the storage unit for discharge of high temperature water to a high temperature line and an additional outlet from the storage unit for discharge of lower temperature water to a low temperature line; a pump to circulate water through the system, a thermostat responsive to the temperature of water in the storage unit and connected by an electric circuit to said pump and heating unit for actuating the pump and heating unit to circulate water through the system and maintain the water in the storage unit at a predetermined temperature at all times, a switch electrically connected to said heating unit to actuate the same, and a flow motor in said high temperature line actuating said switch to operate said heating unit independently of said thermostat and of the temperature of water in the storage unit and releasing said switch to close the circuit from the thermostat to the heating unit when water is not being drawn from the high temperature line for actuation of the heating unit responsive to said thermostat.

3. In a water heater system having a storage unit fed by a cold water inlet and a single heating unit with connections therebetween for circulation of water, and an outlet in the return connection from the heating unit to the storage unit for discharge of high temperature water to a high temperature line and an additional outlet from the storage unit for discharge of lower temperature water to a low temperature line; a pump to circulate water through the system, a thermostat responsive to the temperature of water in the storage unit and connected by an electric circuit to said pump and heating unit for actuating the pump and heating unit to circulate water through the system and maintain the water in the storage unit at a predetermined temperature at all times, a switch electrically connected to said heating unit to actuate the same, and a flow motor in said high temperature line actuating said switch to operate said heating unit independently of said thermostat and of the temperature of water in the storage unit, and means in said return connection to compel the water being discharged to said high temperature line to pass from said storage unit through said heater to said high temperature line.

4. In a water heater system having a storage unit fed by a cold water unit and a single heating unit with connections therebetween for circulation of water, and an outlet in the return connection from the heating unit to the storage unit for discharge of high temperature water to a high temperature line and an additional outlet from the storage unit for discharge of lower temperature water to a low temperature line; a pump to circulate water through the system, a thermostat responsive to the temperature of water in the storage unit and connected by an electric circuit to said pump and heating unit for actuating the pump and heating unit to circulate water through the system and maintain the water in the storage unit at a predetermined temperature at all times, a single pole double throw switch connected to said high temperature water outlet and actuated by flow of water therethrough, an electrical circuit connecting said switch to said heating unit and thermostat for control of the heating unit by the thermostat when the switch is in the throw position established by no flow of water through said high temperature line, and an electrical circuit connecting said switch to said heating unit independently of the thermostat circuit when said switch is moved to the throw position thereof established by flow of water through said high temperature line to actuate the heating unit independently of the thermostat and of the temperature of the water in the storage unit.

5. In a water heater system having a storage unit fed by a cold water inlet and a single heating unit with connections therebetween for circulation of water, and an outlet in the return connection from the heating unit to the storage unit for discharge of high temperature water to a high temperature line and an additional outlet from the storage unit for discharge of lower temperature water to a low temperature line; a pump to circulate water through the system, a thermostat responsive to the temperature of water in the storage unit and connected by an electric circuit to said pump and heating unit for actuating the pump and heating unit to circulate water through the system and maintain the water in the storage unit at a predetermined temperature at all times, and a single pole double throw switch pivoted in the high temperature water line, said switch in normal throw position connecting the thermostatic circuit to the heating unit and in pivoted throw position established by flow of water through said high temperature line connecting the heating unit to a source of current for actuating the heating unit independently of the thermostat and of the temperature of the water in the storage unit.

ADOLF J. BURKLIN.

REFERENCES CITED

The following references are of record in the file of this patent:

UNITED STATES PATENTS

| Number | Name | Date |
|---|---|---|
| 903,862 | Humphrey | Nov. 17, 1908 |
| 1,008,077 | Schroder | Nov. 7, 1911 |
| 1,141,247 | Hudler | June 1, 1915 |
| 1,441,201 | Baker | Jan. 9, 1923 |
| 2,345,209 | Moore | Mar. 28, 1944 |